July 15, 1958 E. D. RANEY 2,843,322
TEMPERATURE CONTROL SYSTEM FOR AUTOMOBILES OR THE LIKE
Filed Feb. 18, 1955 2 Sheets-Sheet 1

INVENTOR.
ELDON D. RANEY
BY
ATTORNEY

July 15, 1958  E. D. RANEY  2,843,322
TEMPERATURE CONTROL SYSTEM FOR AUTOMOBILES OR THE LIKE
Filed Feb. 18, 1955  2 Sheets-Sheet 2
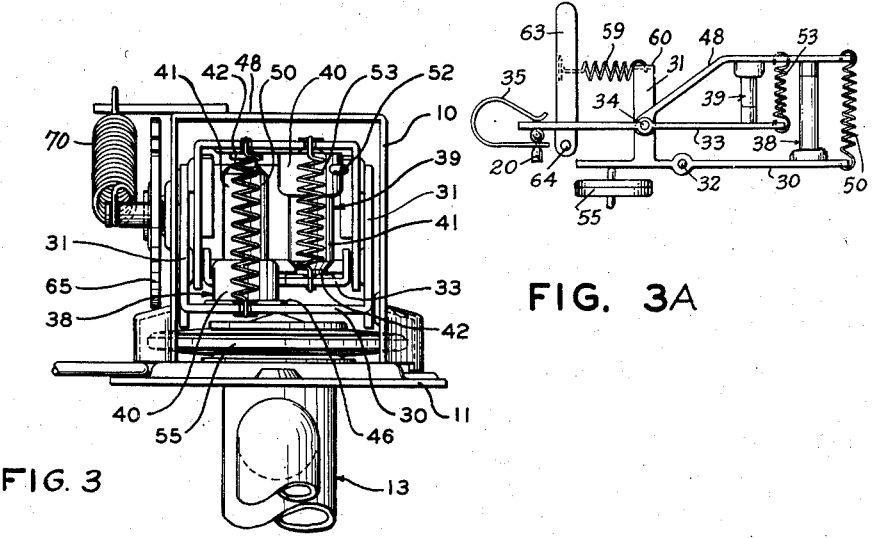
FIG. 3
FIG. 3A
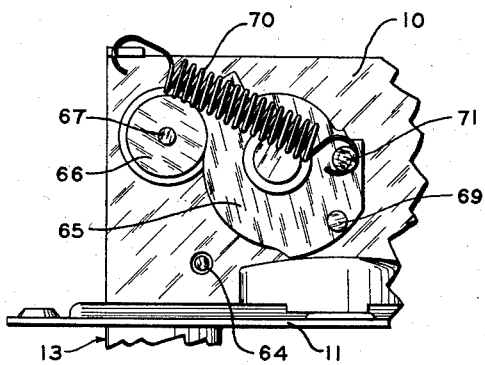
FIG. 4
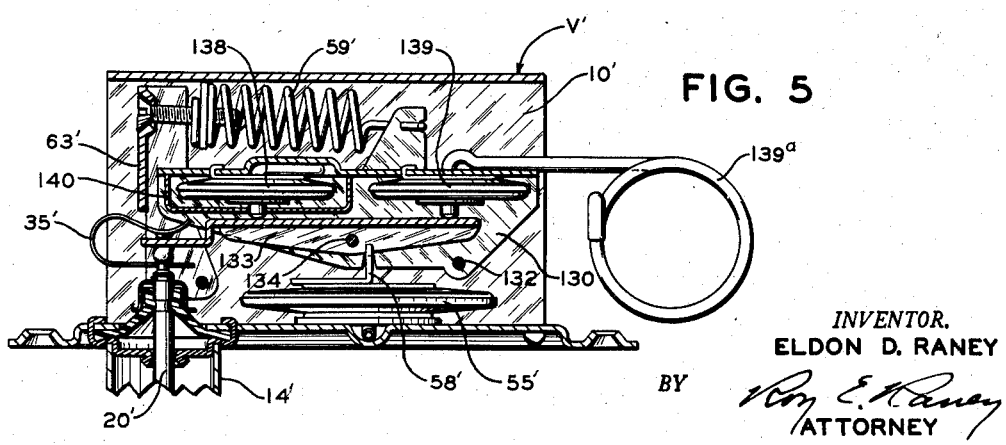
FIG. 5
INVENTOR.
ELDON D. RANEY
BY
ATTORNEY United States Patent Office 2,843,322
Patented July 15, 1958

2,843,322

TEMPERATURE CONTROL SYSTEM FOR AUTOMOBILES OR THE LIKE

Eldon D. Raney, Columbus, Ohio, assignor to Ranco Incorporated, Columbus, Ohio, a corporation of Ohio Application February 18, 1955, Serial No. 489,029

7 Claims. (Cl. 236—37)

The present invention relates to control mechanism for space heating systems for internal combustion engine driven vehicles, particularly heating systems for passenger compartments of automobiles in which outside air is passed through a heater, comprising a hot liquid radiator, and into the compartment, the flow of liquid through the heater being controlled automatically to maintain a predetermined temperature in the compartment.

It is common practice to force outside air through the heater and into the compartment either by a blower or by the forward movement of the automobile, and to regulate the flow of liquid through the heater by a thermostatically operated valve having the temperature sensing portion thereof responsive to a more or less mean temperature of the passenger space. It will be appreciated that the volume of heating liquid passing through the heater will be more or less proportional to the speed of the automobile engine since the liquid is circulated by the engine driven pump, and that the amount of heat absorbed from the heater by the air from instant to instant depends on the volume of liquid passing through the heater. Since the volume of air moved through the heater is practically constant, changes in engine speed affects the temperature of the air discharged from the heater. For example, should the circulating pressure of the heating liquid decrease materially as a result of a decrease in engine speed, the valve opening restricts the flow to the extent that the air is insufficiently heated for comfort requirements, producing an immediate cold sensation to the occupants of the automobile until the mean temperature of the air falls and causes the thermal element to increase the valve opening. Likewise, when the thermal element opens the valve to accommodate a low pressure flow of heating liquid at the required volume and the speed of the engine is then increased the liquid pressure increases and a larger volume of liquid is passed through the heater resulting in an immediate rise in temperature of the air discharged from the heater considerably in excess of that required to maintain passenger comfort. The principal object of the invention is the provision of a control system for vehicles of the type mentioned which responds quickly to relatively rapid fluctuation in the temperature of the air emanating from the heater to control the valve opening whereby the flow of liquid through the heater is such that uncomfortable variations in the temperature of air entering the compartment is prevented.

In carrying out the invention, a valve is provided for controlling the flow of heated liquid through the air heater and is actuated by a first thermostatic element responsive to the mean temperature of the air in the compartment in conjunction with a second thermostatic element closely responsive to temperature changes of the air discharged from the heater, and a third thermostatic element having a relatively slow or lagging response to the temperature of the air discharged from the air heater and effective to nullify or modify the effect of the second thermostatic element. By this arrangement, rapid fluctuations in the temperature of the air discharged from the heater is prevented by operation of the second thermostatic element, but gradual changes in temperature may occur according to the heating requirements of the compartment.

Other objects and advantages of the invention will be apparent from the following description of preferred forms of the invention, reference being made to the accompanying drawings wherein Fig. 1 is a schematic, fragmentary view in section of a passenger automobile having a heating system embodying the invention;

Fig. 3 is an end view of the valve mechanism taken along line 3—3 of Fig. 2, certain members being omitted for sake of clarity;

Fig. 3A is a schematic showing of the lever arrangement for the valve mechanism shown in Figs. 2 and 3, and for sake of clarity certain parts of various elements have been omitted;

Fig. 4 is a fragmentary side elevational view of the valve mechanism, and,

Fig. 5 is a sectional view of a second form of valve mechanism embodying the invention.

Figure 1:
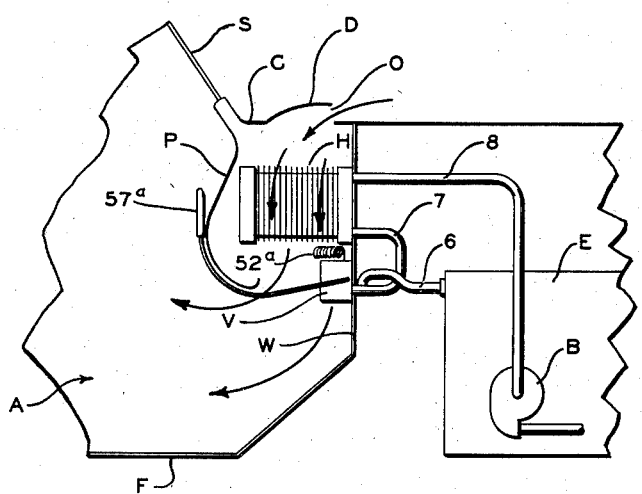

Referring to Fig. 1, an automobile A is shown which may be of conventional construction, comprising a floor F, firewall W, instrument panel P, cowl C, windshield S, and an engine E in the engine compartment. The cowl has an opening O through which air is deflected by a deflector or air scoop D by the forward movement of the automobile, all of which is well known in the art.

Below the opening O a heat exchanger or heater H is installed which is of conventional construction, comprising a series of liquid conduits having heat dissipating fins thereon between which the air passes and absorbs heat as it is forced downwardly into the compartment, as indicated by the arrows. As is usual in heating systems of the type here shown, heated liquid from the engine block is directed through a tube 6 to the inlet of a liquid control valve V. The outlet of the valve is connected by a tube 7 to the inlet of the heater H and the liquid, after passing through the heater, is returned to the intake of the circulating pump B of the engine cooling system through tube 8. As shown, the valve V is attached to the firewall immediately below the air outlet of the heater.

The valve V comprises an open-ended frame or housing formed by a channel shape sheet metal member 10 having a plate 11 attached over the open side thereof by lugs 12 projecting from the edges of the open side of the member through slots in the plate and twisted to lock with the sides of the slots. Only one of the lugs 12 appears in the drawings. The plate 11 projects beyond the channel shape member and has bolt openings for attaching the valve to the firewall or other suitable support.

Figure 2:
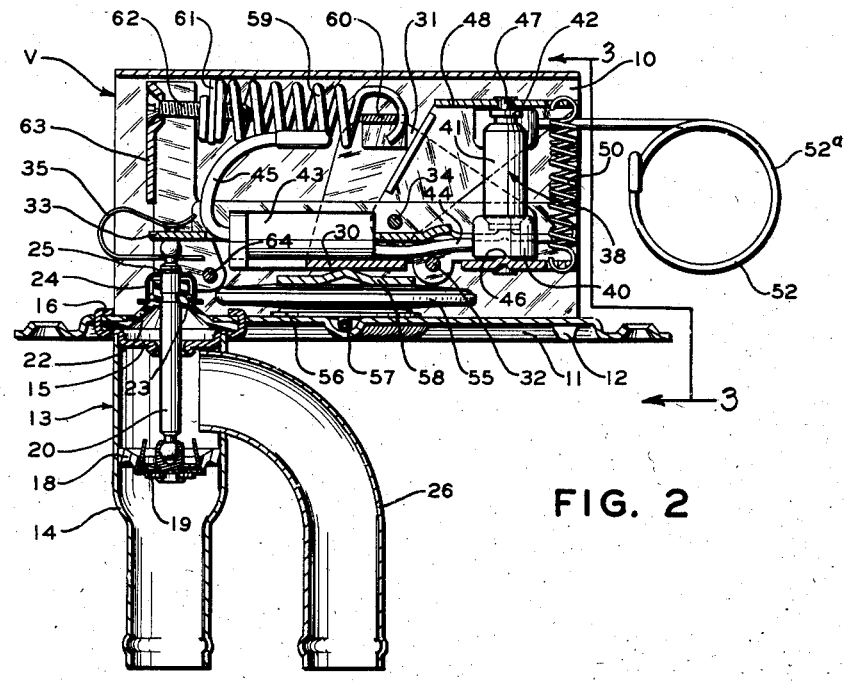
Fig. 2 is a sectional view of an improved valve mechanism forming a part of the heating system.

A valve chamber 13 is attached to the outside of the plate 11 and comprises a tube 14 having a disc 15 brazed over one end, the disc being attached to the plate by lugs 16 thereon projecting through slots in the plate and turned against the inside of the latter. A valve seat, formed by an annular member 18 brazed in the tube 14, is arranged to be closed by a valve member 19 swivelly attached to a valve stem 20 which extends into the chamber through a central guide opening in the disc 15. A Neoprene or other rubber-like diaphragm 22 receives the stem 20 through a central neck portion and forms a liquid seal between the stem and the valve chamber walls. The neck portion is sealingly pressed to the stem by a ring 23 and the peripherial portion of the diaphragm 22 is compressed between the disc 15 and plate 10. Preferably, the neck portion of the diaphragm 22 is enclosed in a cap 24 held in place by a spring clip 25, as shown in Fig. 2. The diaphragm permits the stem 20 to be reciprocated longitudinally by means described hereinafter to move the valve member 19 to and from the valve seat.

A tube 26 is brazed in an opening in the side of the tube 14 to provide an inlet for the valve chamber between the valve seat 18 and the disc 15.

The mechanism for operating the valve stem 20 comprises a compound lever made up of a primary lever 30, which is preferably formed of a sheet metal stamping having upstanding side flanges 31, pivoted on a pin 32 journaled in opposite sidewalls of the housing. A secondary, channel-shape lever 33 is pivoted on the primary lever by a pin 34 which is journaled in the side flanges 31 of lever 30. The left-hand end of the secondary lever 33, as viewed in Figs. 2, 3A, is connected with the stem 20 by a C-shape spring 35, the lower leg thereof being slotted to receive the neck portion beneath a ball end formation on the stem and the other leg of the spring rests on the upper side of the lever. When lever 33 is raised, the valve stem is moved to the valve closing position and when this lever is lowered, the valve is opened.

The relative angular positions of the levers 30 and 33 are controlled by two expansible thermostatic elements 38, 39 which may be of any suitable form, but are preferably like that disclosed in the patent application of Frederick A. Greenawalt S. N. 345,065 filed March 27, 1953. Each element comprises a base 40 having a barrel 41 projecting therefrom and a plunger 42 which reciprocates in the barrel according to expansion and contraction of a liquid filled expansible chamber inside the base and barrel.

The thermostatic element 38 has a cylindrical bulb 43 connected to the expansible chamber therein by a tube 44, the bulb, tube and expansible chamber being filled with a suitable thermostatic liquid, such as a mixture of ethylene glycol and water, which expands upon an increase in temperature. The liquid is introduced into the thermostatic element through a short section of tube 45 on the bulb 43, the tube then being sealed. Of the liquid in the bulb 43, tube 44 and expansible chamber, the major portion is in the bulb so that expansion or contraction of the chamber is proportional to the temperature changes of the liquid in the bulb. The bulb 43 contains a relatively large valume of liquid in relation to its surface area so that the rate of heat exchange between the liquid and the air surrounding the bulb is relatively slow whereby changes of the liquid volume do not correspond to sudden changes in the temperature of the air surrounding the bulb. That is to say, temporary changes in temperature at the bulb 43 do not cause corresponding changes in the position of the plunger 42 of the element 38; however, gradual changes in temperature are reflected by movement of the plunger 42.

The base of the thermal element 38 rests on a ridge 46 formed near the right-hand end of the lever 30, as viewed in Fig. 2, and the plunger 42 thereof engages a ridge 47 formed on the yoke portion of an inverted stirrup 48 having the sides thereof pivoted on the pin 34. The bulb 43 is suitably attached to the lever 30 which positions the thermal element in engagement with the ridges mentioned, and a tension spring 50 is connected between the ends of the lever 30 and the yoke of stirrup 48 and maintains a compression on the plunger of the thermal element and as the plunger is retracted and extended the yoke of stirrup 48 is moved toward and from the right-hand end portion of lever 30, the purpose of which appears hereinafter.

The thermal element 39 is positioned between the yoke portion of the stirrup 48 and the right hand end of lever 33 and a tension spring 53 interconnects the yoke portion of the stirrup and lever 33, as shown in Figs. 3, 3A, to cause the lever to be biased counterclockwise about its pivot when the plunger 42 of the element recedes or moves inwardly of the barrel 41. The base of the thermal element 39 and the end of the plunger thereof engage ridges formed on the yoke of the stirrup and the lever 33 respectively, so that the stirrup and lever may pivot relative to the thermal element and maintain a substantially constant point of engagement therewith.

The thermal element 39 has a tube 52 connected with the base thereof and in communication with the expansible chamber therein and the tube and chamber are filled with a liquid like that in the bulb 43. The outer end of the tube 52 is sealed and the volume of the liquid in the tube is susbtantially the same as that in the bulb 43. The surface area of the tube is considerably greater than that of the bulb 43 so that the heat exchange between the air surrounding the tube and the liquid therein is relatively rapid and the temperature of the liquid will therefore closely follow the temperature of the air surrounding the tube so that the plunger 42 of the thermal element 39 responds much more closely to temperature changes than will the corresponding plunger of the thermal element 38, although the degree of movement of the plungers of the two elements are equal for equal changes in temperature of the liquid therein.

The tube 52 of the thermostatic element 39 is formed in a helix 52a extending transversely of the right-hand end of the housing, as seen in Fig. 2 and the valve housing is mounted on the wall W with the helix 52a at the top so that air from the heater not only flows around the helix but through the housing and over the bulb 43 as well.

By the arrangement of the thermostatic elements 38, 39 described, sudden changes in temperature of the air leaving the heater cause the thermostatic element 39 to move the lever 33 about its pivot and shift the valve member 19 to either increase or decrease the flow of liquid in response to decreases or increases in air temperature, and as the temperature of the liquid in bulb 43 approaches that of the liquid in coil 52a, the element 38 gradually shifts the yoke of the stirrup 48 on which the element 39 is bottomed so that the lever 33 is gradually brought back to its normal angular relationship with lever 30.

The lever 30 is moved clockwise by a thermal responsive wafer 55 which may be of any suitable construction, such as two dish-shape, flexible wall members hermetically sealed together about their edges, one of which members is attached to a plate 56 secured to the housing plate 11. A tube 57 is attached to the plate 56 and one end is in open communication with the interior of the wafer 55 while the other end is suitably sealed. The tube and wafer contain a vapor fill of a thermally responsive fluid, such as methyl chloride, which is partly liquid at the usual atmospheric temperatures. The sealed end portion of the tube 57 is formed in a helix 57a and is arranged to be disposed relatively remote from the valve mechanism and in an area generally lower in temperature than the air surrounding the wafer 55 so that the vapor pressure in the wafer is a function of the temperature at the helix 57a, as is well understood by those skilled in the art. In the form of the invention shown, the helix 57a is supported on the face of the instrument panel.

The outer wall of the wafer 55 has a disc 58 thereon which has a conical formation, the apex of which forms a bearing which engages the underside of lever 30. It will be seen that expansion of the wafer 55 moves the lever 30 clockwise about its pivot which shifts the valve member 19 toward its port closing position.

The lever 30 is urged counterclockwise, i. e., in the valve opening direction by a tension range spring 59, one end of which is hooked over a bar 60 is attached to and spans the side flanges of the lever and the other end of which is attached to a nut 61 threaded on a screw 62 rotatably supported by a sheet metal, channel shape lever 63. The lever 63 is pivotally supported on a pin 64 journaled in the side walls of the housing and is adapted to be swung about its pivot by a cam 65 and follower wheel 66, the latter being supported on an axle 67 supported between the side flanges of the lever 63, only one of which appears in the drawings. One end of the axle 67 projects through a slot in the side of the housing and the follower wheel 66 is mounted thereon.

The cam 65 is suitably journaled on the side wall of the housing as seen in Figs. 3, 4, and is adapted to be rotated manually by a Bowden wire, not shown, attached to a pin 69 on the cam face. A tension spring 70 having one end anchored to the frame is connected to a pin 71 on the cam face and tends to counteract the turning effort exerted by the pressure of the cam follower on the cam and thereby reduce the manual turning effort required to adjust the cam. The periphery of the cam is such that the lever 63 is moved counterclockwise as seen in Fig. 2 to stretch spring 59 and thereby increase the load on the wafer 55.

Any other suitable mechanism could be employed to adjust the tension of the spring 59 which, by increasing or decreasing the load on the wafer 55 decreases and increases, respectively, the temperature at which the valve is opened.

The operation of the heating system is as follows:

When the temperature in the compartment at the helix 57a is 75° F. or above, for example, according to the setting of cam 65, the wafer 55 is in its expanded condition to maintain the valve 19 closed on the seat 18 through the levers 30, 33 and no liquid passes through the heater. As soon as the temperature at the helix 57a drops below 75° F., the wafer 55 commences to collapse under the pressure of the tension spring 59 acting through the lever 30, which causes the valve member 19 to move from its seat 18 and permit the heated liquid of the engine cooling system to pass through the heater and thus warm the incoming air. The further the temperature of the helix 57a drops below 75° F., the further valve member 19 moves from its seat to thereby increase the volume of liquid flowing through the heater. Conversely, as the temperature at the helix rises toward 75° F., the wafer 55 expands and moves the valve member 19 toward its seat to thereby decrease the volume of liquid through the heater. As a practical matter the changes in temperature of the compartment due to weather conditions occur slowly so that the movement of valve 19 is relatively gradual. The response of the thermostatic element 38 to this gradual change in temperature is relatively slight so that its affect on the valve contra to that of element 55 is practically nil. The gradual increase or decrease in temperature of the air discharging from the heater permits the temperature of the liquid in bulb 43 to change at a rate substantially that of the change in temperature of the liquid in the coiled tube 52a so that the elements 38, 39 maintain the relative positions of levers 30, 33 substantially fixed whereby the valve is positioned according to the operation of element 55.

As mentioned previously, as the speed of the automobile engine decreases, the volume of liquid passing through the heater decreases which results in a drop in temperature of the air entering the compartment. This relatively cool air is discharged from the heater and the helix 52a, being directly in the stream thereof, is quickly reduced in temperature and causes the thermal element 39 to contract, i. e., the plunger 42 thereof recedes into the barrel of the thermostatic element. Since the thermal liquid in bulb 43 responds slowly to temperature changes, as mentioned previously, the length of the thermal element 38 remains substantially unchanged which results in spring 53 drawing lever 33 counterclockwise and moving valve 19 further from its seat and thereby increases the flow of liquid which prevents a sharp reduction in temperature of the air entering the compartment.

If the engine speed is increased to the original speed within a short period the increased liquid flow overheats the air discharging from the heater causing the element 39 to expand and move the valve toward the closed position. Should the engine continue at the increased speed however, the liquid in bulb 43 is gradually reduced to the same temperature as the helix 52a and contracts and causes element 38 to shorten and by the action of spring 50 restore the original relative positions of the levers 30, 33 by moving the yoke portion of the stirrup 48 toward the lever 30, and the control of the valve operation is thereby restored to the wafer 55 which is responsive to the mean temperature in the compartment.

Conversely, should the speed of the automobile be increased suddenly while the valve 19 is relatively wide open, the volume of liquid passing through the heater is greatly increased which results in a considerable increase in temperature of the air discharging from the heater. Again, the liquid in helix 52a quickly responds to this increased temperature to cause thermal element 39 to expand and move lever 33 to tend to close valve member 19 on the seat 18 and reduce the volume of liquid flowing through the heater. This prevents a rise in temperature of the discharged air which would otherwise be uncomfortable to the occupants until helix 57a could respond to reduce the heat input. As the temperature of the liquid in the bulb 43 gradually approaches that of the liquid in the helix 52a, the stirrup is moved upwardly by expansion of the thermal element 38 and thereby causes lever 33 to return to its normal position relative to the lever 30. Thus, control of the valve is gradually restored to the wafer 55 according to the mean temperature at helix 57a.

It will be seen that the arrangement of the two thermal elements 38, 39 and their associated levers, etc. prevent wide transient temperature variations in the passenger compartment by forestalling any appreciable influx of either under-cooled or over-heated air, yet gradual increases and decreases in the temperature of the incoming air may occur in accordance with requirements to maintain the compartment temperature at that for which the control valve is set.

Referring to Fig. 5, a valve mechanism is shown which functions similarly to the valve mechanism V but is somewhat modified as described hereinafter. The similar parts are designated by like reference numerals having a prime added thereto. As in the valve V, the valve stem 20' is actuated by an expansible thermal element or wafer 55' through a leverage system comprising an inverted channel shaped lever 130 which is pivoted on a pin 132 supported in the walls of the housing 10', and a second lever 133 pivotally carried by the lever 130 on a pivot pin 134 supported in the sides of the last mentioned lever. The left hand end of the lever 133 is connected with the valve stem 20' in the same manner as described with reference to the valve mechanism V, and the wafer 55' is connected with the lever 130 by a bearing plate 58' having edges engaging in notches formed in the lower side edges of the lever. Although not shown, the wafer 55' has a tube and bulb similar to the bulb 57a and the bulb, tube and wafer are filled with a suitable vapor, as explained previously with reference to the wafer 55.

The relative angular positions of the levers 130 and 133 and consequently the operative relationship of the wafer 55′ with the valve stem 20′ are determined by two vapor filled expansible wafers 138, 139 which are attached to the underside of the lever 130 and each has stems which engage the lever 133 on opposite sides of the pivot pin 134, as shown. The wafers 138, 139 may be of any suitable form and are preferably similar to the wafer 55′ and contain a vapor, such as methyl chloride, so that the internal pressures vary with the changes in temperature. Thus, the wafers 138, 139 tend to rotate lever 133 in opposite directions upon an increase in temperature so that when the temperatures of the vapor inside the elements 138, 139 are the same, the two elements balance one another to establish a normal angular relationship between levers 130 and 133, but one overcomes the other should the temperature of the vapor therein increase above the other and tilts lever 133 relative to lever 130. It will be seen that when the temperatures of the elements 138, 139 are the same, expansion and contraction of the element 55′ actuates the valve stem 20′ in accordance with the mean temperature in the passenger compartment where the bulb thereof is located similarly to the bulb 57a of valve V.

Preferably, to provide maximum speed of response of the wafer 139 to changes in temperature of the air passing through the housing 10′, a capillary tube in the form of a coil 139a is connected thereto containing vapor and in communication with the interior of the wafer.

In accordance with the invention the thermal element 138 is made to lag in its response to temperature changes relative to the response of the thermal element 139. In the form shown this lag is effected by shielding the wafer from air currents passing through the housing 10′. The shield comprises a channel shaped sheet member 140 attached between the sides of the lever 130 to substantially shield the element 138 from air passing through the housing 10′. It is to be noted that the valve V′ is to be mounted in the automotive vehicle immediately beneath the heater H as described with reference to the valve V so that the elements 138, 139 are subjected to the temperature of the air discharging directly from the heater as described with reference to the mechanism V.

It will be seen that the thermal element 139 will quickly respond by expanding and contracting should the temperature of the air discharging from the heater quickly increase or decrease, but the thermal element 138, on the other hand, being shielded by the member 140 will not respond to these transitory fluctuations in temperature but only to more or less gradual changes which permit the temperature of the element to assume that of the air. By this arrangement should the air temperature discharging from the heater suddenly drop for example, the element 139 collapses to a certain extent which will permit the element 138 to expand and move the lever 133 to increase valve opening, although element 55′ has not been affected by the decreased air temperature, and thereby increase the flow of liquid through the heater thus tending to restore the discharge air to a higher temperature. Likewise, should the air discharging from the heater suddenly increase, the element 139 will expand and move the lever 133 to tend to close off the valve and thereby reduce the heating effect of the heater.

In the event the temperature in the automobile body changes due to weather conditions, the element 55′ gradually moves the valve to either increase or decrease the flow of liquid through the heater, and this gradual change in temperature affects both elements 138, 139 equally whereby the element 138 counteracts the element 139 to maintain the normal relative positions of the levers 130, 133.

While but two forms of the invention have been described it is to be understood that other forms, adaptations and modifications could be adopted, all falling within the scope of the claims which follow:

I claim:

1. The combination of a valve, a first pivoted lever, a thermostatic element for actuating said lever about its pivot, a second lever pivoted to said first lever at a point spaced from the pivot of said first lever and operatively connected to said valve whereby said valve may be operated by movement of said thermostatic element through said levers, and a thermally responsive element engaging said second lever and operable to shift said second lever about its pivot relative to the first lever to modify the operative effect of the first mentioned element on said valve.

2. The combination of a valve, a first lever, thermostatic means for actuating said lever, a second lever pivoted to said first lever at a point spaced from the pivot for said first lever and operatively connected to said valve whereby said valve may be operated by said thermostatic means through said levers, a first thermally responsive element operable to shift said second lever about its pivot relative to the first lever in response to temperature changes to modify the operative effect of said thermostatic means on said valve, and a second thermally responsive element operative to oppose said first element for nullifying the operative effect of said first element when the temperature of said second element is the same as the temperature of said first element, and means to cause said second element to respond to temperature changes at a slower rate than said first element.

3. The combination of a valve, a first lever, thermostatic means for actuating said lever, a second lever pivoted to said first lever at a point spaced from the pivot for said first lever and operatively connected to said valve whereby said valve may be operated by said means through said levers, a base movable relative to said levers, a thermally responsive expansible element having one end supported on said base and engaging said second lever and operable to shift said second lever about its pivot relative to the first lever to modify the operative effect of said thermostatic means on said valve, and a second expansible thermally responsive element supported on said base and engaging said first lever, and means to cause said second element to respond to changes in temperature at a rate substantially slower than the first mentioned element.

4. The combination of a valve, a first lever, a second lever pivotally carried by said first lever at a point spaced from the pivot of said first lever and operatively engaging said valve, means maintaining said levers in a predetermined angular position during substantially constant temperature conditions in a given area and to vary said angular position according to the rate of change in temperature in said given area, and thermostatic means to move the first mentioned lever to operate said valve.

5. The combination of a valve, a first lever, a second lever pivotally carried by said first lever at a point spaced from the pivot for said first lever and operatively engaging said valve, means maintaining said levers in a predetermined angular position during substantially constant temperature conditions in a given area and to vary said angular position according to the rate of change in temperature in said given area, said means including a pair of expansible thermally responsive elements one of which is adapted to respond to changes in temperature at a rate substantially slower than the other, and thermostatic means to move the first mentioned lever to operate said valve.

6. In combination with a valve, a first lever, an element for actuating said lever, a second lever pivoted intermediate its ends on said first lever and connected with said valve to actuate said valve, two temperature responsive devices interconnecting said levers and arranged to respond to the temperature of the same medium and engaging said second lever on opposite sides of the pivot therefor and operative to tend to move said second lever about its pivot in opposite directions in response to increases in the respective temperatures thereof, and means to render one of said devices less responsive to temperature changes of the medium than the other.

7. In combination with a valve, a first lever, an element for actuating said lever, a second lever pivoted intermediate its ends on said first lever and connected with said valve to actuate said valve, two vapor filled expansible devices attached to said first lever and engaging said second lever on opposite sides of the pivot therefor, and means to shield one of said devices from ambient air streams.

References Cited in the file of this patent

UNITED STATES PATENTS

| | | |
|---|---|---|
| 1,289,435 | Fulton | Dec. 31, 1918 |
| 2,261,343 | De Florez | Nov. 4, 1941 |
| 2,603,422 | Sargeaunt | July 15, 1952 |

FOREIGN PATENTS

| | | |
|---|---|---|
| 343,017 | Great Britain | Jan. 28, 1931 |